UNITED STATES PATENT OFFICE.

THOMAS J. MAYALL, OF ROXBURY, MASSACHUSETTS.

IMPROVEMENT IN SUBSTITUTES FOR EMERY-CLOTH.

Specification forming part of Letters Patent No. 27,817, dated April 10, 1860.

*To all whom it may concern:*

Be it known that I, THOMAS J. MAYALL, of Roxbury, in the county of Norfolk and State of Massachusetts, have invented a new and useful Article of Manufacture as a Substitute for Emery-Cloth or Emery-Paper, and I do hereby declare that the following description forms a full and exact specification of the same, wherein I have set forth the nature and principles of my improvements, by which my invention may be distinguished from all others of a similar class, together with such parts as I claim and desire to have secured to me by Letters Patent.

My improvement consists in forming a cheap and durable substitute for emery-paper, emery-cloth, or sand-paper. I effect these results by making a composition of india-rubber or gutta-percha, emery or sand, and sulphur, rolled into sheets and cemented by means of rubber or gutta-percha or rubber cement to sheets of cloth or paper, and afterward cured by heat.

Among the various modes by which the result may be obtained, I will describe the following: I take one pound of rubber or gutta-percha, five ounces of sulphur, and five pounds of emery or sand, and mix them thoroughly together. This composition is then passed between rollers and formed into sheets, which sheets are attached to cloth or paper or other suitable backing, previously coated with the ordinary vulcanizable compound of rubber or gutta-percha, or with the ordinary rubber cement used by rubber-manufacturers, by feeding the whole through another set of rolls. The sheets of the composition, thus fastened to the cloth or paper or other backing, are then submitted to a temperature of 260° or 300° Fahrenheit between metallic plates from one to four hours.

The metallic plates may be heated by a steam-jacket or otherwise, and under pressure or not, as may be desired, and when a strong mechanical pressure and also a high pressure of steam is employed the curing may be effected in fifteen minutes.

The proportions of the above-described composition can, it is evident, be very much varied—as, for instance, a much larger quantity of emery or sand in proportion to the other ingredients can be used, and olive-oil, which renders the composition tougher and more flexible, can, if desired, be added, while any thickness of sheet can be made and any of the different grades of emery be used.

The result obtained is a cheaper and more durable article of manufacture than the emery-cloth, emery-paper, or sand-paper heretofore used.

The composition can be made hard or soft, rigid or flexible, as desired. These qualities depend upon the proportion of rubber or gutta-percha used. Ordinary rubber or gutta-percha can be used without vulcanizing it, but the result is very inferior.

The great advantage of this process is that I am enabled to have a flexible sheet for polishing, which is wholly novel and is of great use in the arts.

Having thus described my improvements, what I claim as my invention, and desire to have secured to me by Letters Patent, is—

The new article of manufacture as a substitute for emery-cloth, emery-paper or sand-paper, the same consisting of a sheet of india-rubber or gutta-percha of any desired thickness, with which emery or sand is incorporated and combined, cemented to a sheet of cloth or paper or other backing, and subjected to heat substantially as described, for the purpose of polishing, sharpening or other similar purposes.

THOS. J. MAYALL.

Witnesses:
JOSEPH GAVETT,
ALBERT W. BROWN.